Oct. 30, 1945. R. A. DAILY 2,388,042
METHOD OF SEALING STORAGE BATTERIES
Filed Feb. 17, 1943 2 Sheets-Sheet 1
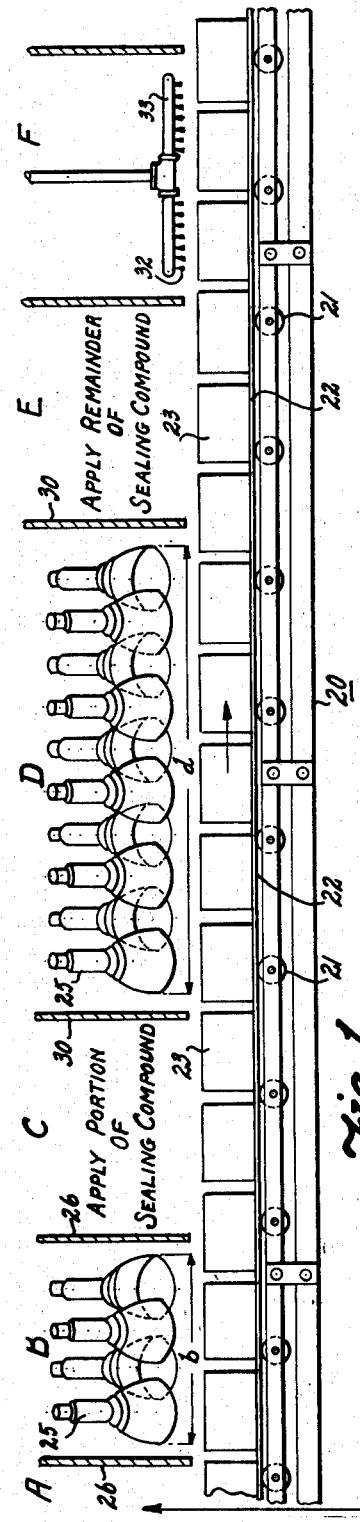
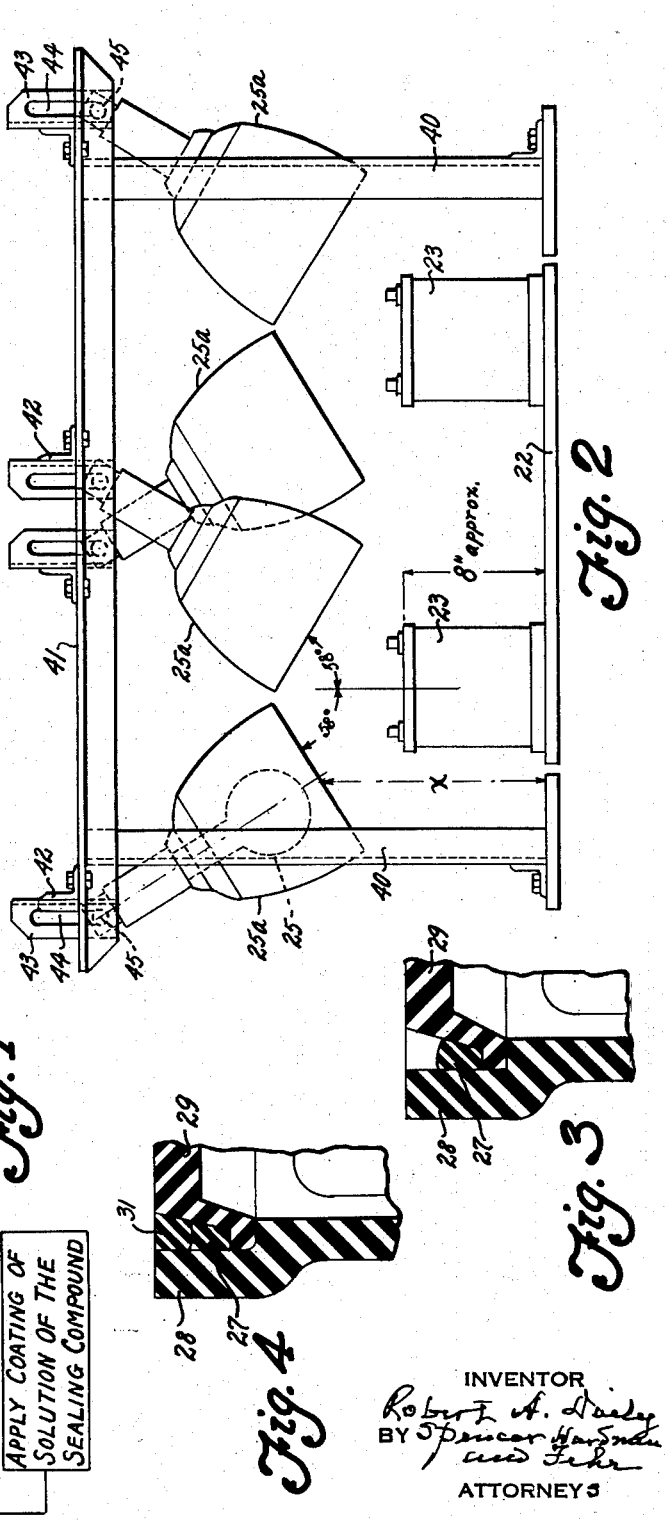
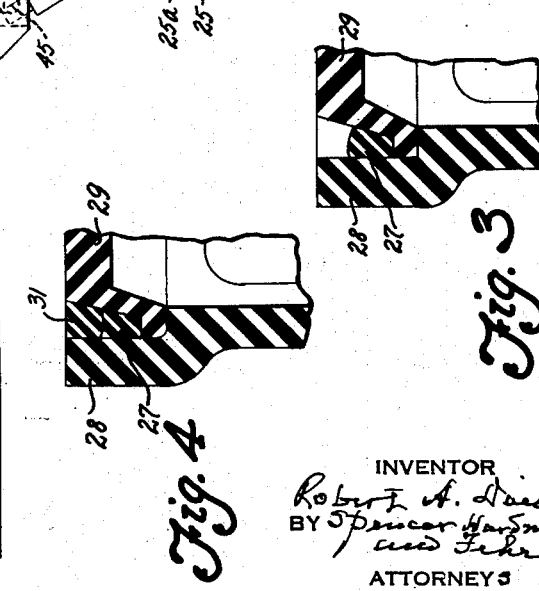
INVENTOR
Robert A. Daily
BY Spencer Hardman
and Fehr
ATTORNEYS Oct. 30, 1945. R. A. DAILY 2,388,042
METHOD OF SEALING STORAGE BATTERIES
Filed Feb. 17, 1943 2 Sheets-Sheet 2
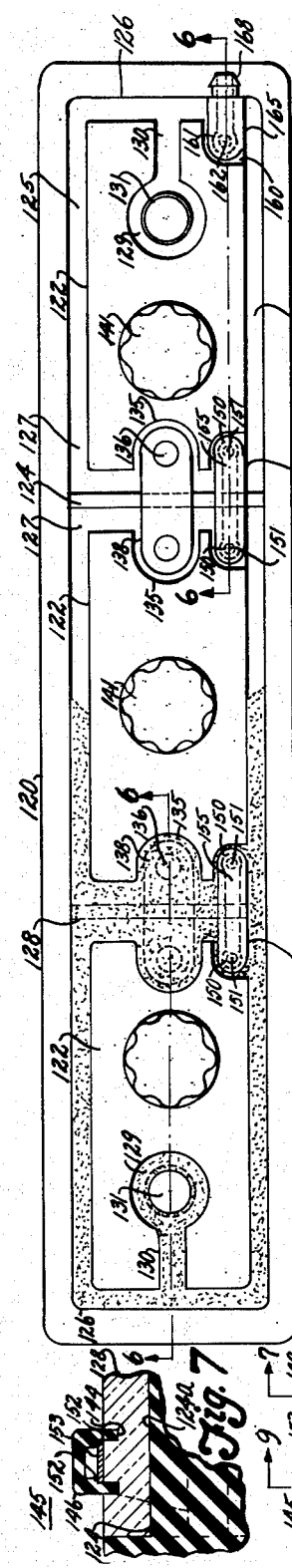
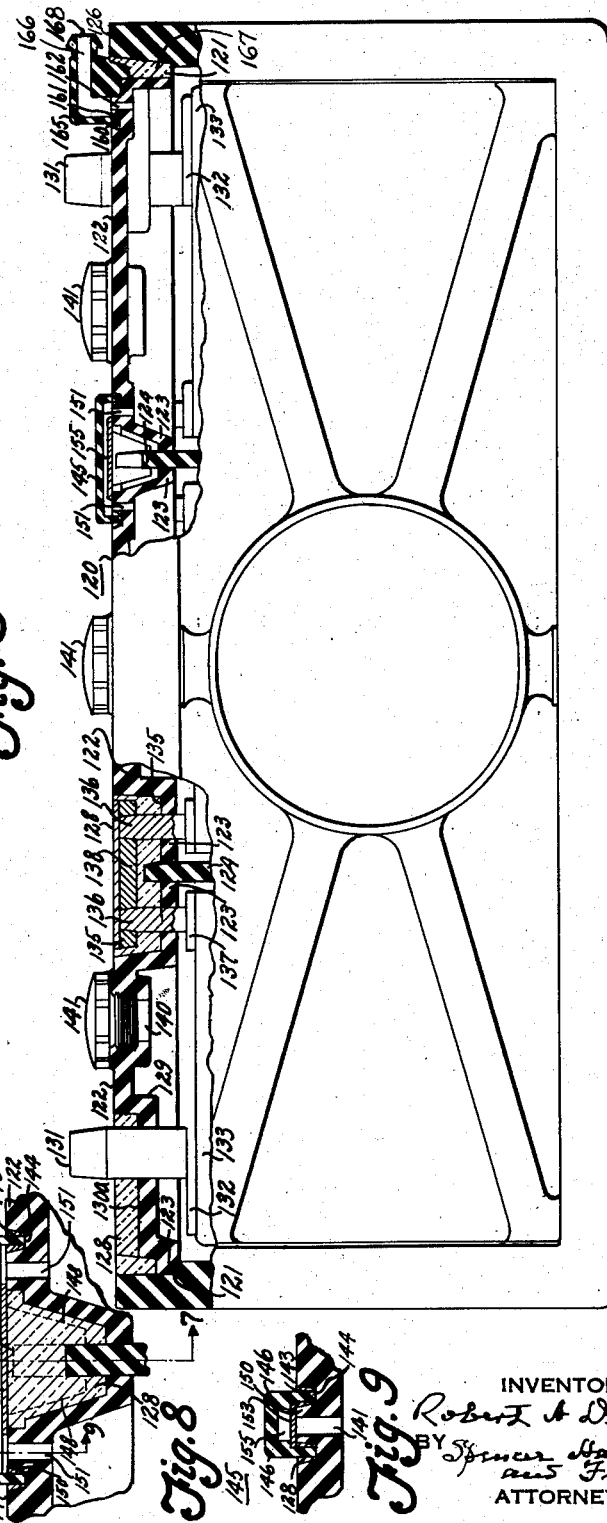
INVENTOR
Robert A. Daily
BY Spencer Hardman
and Fehr
ATTORNEYS Patented Oct. 30, 1945

2,388,042

UNITED STATES PATENT OFFICE 2,388,042

METHOD OF SEALING STORAGE BATTERIES

Robert A. Daily, Muncie, Ind., assignor to General Motors Corporation, Detroit, Mich., a corporation of Delaware Application February 17, 1943, Serial No. 476,183

3 Claims. (Cl. 18—59)

This invention relates to the art of sealing the joint between a container and its cover and more particularly to sealing the cover of a storage battery. The present invention is related particularly to the manufacture of storage batteries for automotive and aircraft use.

This application is a continuation in part of R. A. Daily application Serial No. 419,187, filed November 14, 1941, and of Roberts and Daily application Serial No. 431,618 filed February 20, 1942.

It has been the practice to seal the joint between the battery box and its cover with a bituminous compound generally known as "hydrolene." The trade name "hydrolene" applies to a variety of sealing compounds which vary in physical characteristics. One of these characteristics is the ability of the compound to wet the surfaces of the battery box and cover when the sealing compound is applied in melted condition. Because difficulty has been experienced by manufacturers of storage batteries in securing a good bond between the sealing compound and the box and cover, manufacturers of hydrolene have introduced into their hydrolene compound some volatile matter tending to break the surface tension of the hydrolene when melted in order that the hydrolene may better wet the surfaces of the box and cover providing the grooves for receiving the sealing compound. Such a hydrolene compound is known as the "wetting" type. A good bond between hydrolene of the "wetting" type and the surfaces of the box and cover can be obtained provided these surfaces receive an infrared ray treatment according to the disclosure of the copending application of George K. Shroyer, Serial No. 379,896, filed Feb. 20, 1941. While the bond which can be effected according to the Shroyer process between box and cover surfaces and hydrolene of the wetting type may be a satisfactory bond, hydrolene of the wetting type does not hold up as well as indicated by the vibration test in which a completed box is subjected to a period of continuous vibration in the endeavor to determine the ability of the sealing compound to resist leakage of electrolyte over a long period.

It has been recognized that a sealing compound of the non-wetting type having no volatile matter tending to break surface tension stands up better under the vibration test than sealing compound of the wetting type. But the problem heretofore unsolved is that of securing a good bond between box and cover surfaces and non-wetting sealing compounds. I have discovered that the failure to obtain a satisfactory seal between non-wetting sealing compounds and box and cover surfaces is due to failure to remove air from the surface pores of the parts before the sealing compound is applied. If this air is not eliminated it will be trapped by the sealing compound and it will serve as a barrier preventing adhesion of the sealing compound to the box and cover surfaces.

It is an object of the present invention to remove air from the surface pores before the melted sealing compound is applied and thereby to obtain a permanent bond between the sealing compound, for example, hydrolene of the non-wetting type, and all surfaces contacted thereby including the box and cover surfaces defining seal receiving grooves and also the surfaces of metal terminal posts extending through the covers and the surfaces of metal straps connecting terminal posts of adjacent cells. By so doing, I am able to construct a battery having its cell covers permanently sealed to the battery box and having its cell terminal posts permanently sealed to the covers and the intercell connecting straps permanently sealed within the contacting portions of the sealing compound.

I accomplish this object by coating all surfaces to be contacted with sealing compound with a solution of the non-wetting hydrolene and a volatile liquid. This coating is applied in advance of the application of the first portion of melted sealing compound to the seal grooves provided by the box and covers. The coating penetrates into the microscopic pores and irregularities of the surfaces and replaces air; and any dirt particles clinging to these surfaces become incorporated in the coat. This precoating prevents the trapping of air upon the surfaces when the non-wetting hydrolene is applied. If there be any air remaining upon the precoated surfaces at the time the hydrolene is introduced, the air does not remain trapped in the hydrolene but is caused to come to the surface thereof due to subjecting the hydrolene to the action of infra-red rays after the manner disclosed in the Shroyer application referred to.

The volatile solvent carries the sealing compound into the pores of the surfaces contacted by the sealing compound solution. The dried coating is bonded to the surfaces by integral anchorage portions locked into the pores of these surfaces. The melted sealing compound seals against the coating and fuses with the coating, thus providing a sealing body permanently bonded to these surfaces by virtue of the anchorage portions formed by the precoating.

Another object of this invention is to provide inter-cell venting members and at least one end cell venting member which are bonded to the covers by the sealing compound by virtue of the precoating of the venting members and those surfaces of the covers which support the venting members.

Further objects and advantages of the present invention will be apparent from the following description, reference being had to the accompanying drawings wherein a preferred embodiment of the present invention is clearly shown.

In the drawings:

Fig. 1 is a fragmentary view of that portion of the assembly line which is concerned with the application of the sealing compound.

Fig. 2 is a sectional view on an enlarged scale showing the location of infra-red lamps with respect to the batteries.

Figs. 3 and 4 are fragmentary sectional views showing the steps of applying the sealing compound between the battery box and cover.

Fig. 5 is a plan view of a storage battery having sealing compound permanently bonded to the box, cell covers, cell terminals, intercell terminal-connectors, intercell vent members and an end cell vent member.

Fig. 6 is a side view of the battery shown in Fig. 5, certain parts being shown in section, the sections being taken on lines 6—6 of Fig. 5.

Fig. 7 is a sectional view on lines 7—7 of Fig. 8.

Fig. 8 is an enlarged sectional view of a portion shown to the right of the center of Fig. 6.

Fig. 9 is a sectional view on lines 9—9 of Fig. 8.

According to Fig. 1, the assembly line includes a frame 20 supporting a plurality of rollers 21 which support a conveyor belt 22 upon which the batteries 23 travel along the assembly line, the direction of travel being from left toward right in this view. The batteries 23 are conveyed, without stopping, successively past stations A through F. Station A is not immediately ahead of station B, but is preferably about five minutes ahead of station B.

At station A, the precoating of non-wetting hydrolene and a volatile solvent is applied to every surface to be contacted by the hydrolene, including the surfaces of the seal receiving grooves provided by the box and cell covers, the surfaces of the cell terminal posts to be sealed to the cell covers and the surfaces of the intercell terminal connecting straps which are to be embedded in hydrolene. These parts will be described in detail with reference to Figs. 5 to 9. The time which elapses between station A and station B is sufficient to permit at least partial drying of the coating of solution of the sealing compound which is applied at station A. This solution is made by dissolving the sealing compound (preferably "non-wetting" hydrolene) in a suitable solvent such as carbon tetrachloride, dichlorpropane, petro-benzol or any other solvent that will evaporate, leaving behind a thin film of the sealing compound on the surfaces to be sealed. As an example, one part by weight of the hydrolene is dissolved in eight parts by weight of carbon tetrachloride and this solution is applied by a brush upon the surfaces which are to contact with the melted sealing compound. Between station A and station B the coating dries in air for about five minutes.

At station B the batteries pass under a bank of infra-red lamps 25 in a protecting enclosure 26. The batteries receive the treatment of infra-red rays for the distance $b$ (Fig. 1) for about 36 seconds. This treatment removes any volatile matter yet remaining in the coating. The lamps at station B heat the seal receiving surfaces and liquefy the coat preparatory to receiving some of the sealing compound applied at station C.

At station C a portion of the sealing compound indicated at 27 in Fig. 3 is introduced into the seal groove between the box 28 and the cover 29. The sealing compound 27 readily wets the surfaces to be contacted by the sealing compound since the precoating prevents the trapping of air between the sealing compound and the surfaces.

Then the batteries pass along station D where they are subjected to the action of infra-red rays projected by lamps 25 located within a protecting housing 30. The distance $d$ (Fig. 1) is such that the batteries will be subjected to infra-red rays for about 72 seconds. During this treatment any air located below the top surface of the sealing compound 27 will rise and will form bubbles on the top surface of the sealing compound 27. By the time the batteries have passed to the right of station D, the skin of the surfaces and the body of sealing compound 27 will have become thoroughly heated properly to receive the additional sealing compound 31 (Fig. 4) which is applied at station E. Because the bodies 27, 28 and 29 thus have been thoroughly heated by the time they pass from station D, the body of sealing compound 31 remains liquid for a time sufficient to enable the air which was in the bubbles upon the surface of the sealing compound 27 to rise to the top surface of the sealing compound 31. Also any air between the sealing compound 31 and the bodies 28 and 29 will rise to the top of the sealing compound 31.

These air bubbles are broken up by impinging jets 32 of flaming gas issuing from a pipe 33.

The infra-red treatment at station D is effective not only to cause air to be released from the hydrolene 27, but also is effective to reduce the surface tension in the hydrolene body 27 so that any convex meniscus formed on the surface of the hydrolene at station C will disappear and the hydrolene will actually creep upwardly along the coated surfaces of the seal groove.

Fig. 2 shows that the conveyor belt 22 supports two lines of batteries. The bank of lamps for each line of batteries at station B comprises four model KB 1000-watt infra-red lamps having gold plated reflectors 25a and so located that the axes of the reflectors and lamps are inclined approximately 32° to the vertical, the planes of the edges of the reflectors making an angle of 58° with the vertical as indicated in Fig. 2. The distance X in Fig. 2 is preferably approximately 13". These are the dimensions which have been found suitable for use in the manufacture of automobile storage batteries. Obviously other dimensions may be required for batteries which are larger or smaller than these. For each line of batteries the bank at station D comprises ten of the 1000-watt lamps. Any suitable means may be employed for supporting these lamps in the manner specified. Fig. 2 shows a simple frame work made of angle irons including uprights 40, cross bars 41 and longitudinally extending bars 42 for supporting brackets 43 having vertical slots 44 for receiving threaded end supporting rods 45 which may be clamped in the desired position of adjustment along the slots 44 by suitable nuts 46.

The particular brand of hydrolene which is used is of the non-wetting type because it is free of volatile matter tending to break surface tension. In order to be sure that this characteristic exists, the hydrolene is heated for a time and at a temperature sufficient to expel volatile matter. Heating at a temperature of around 450° F. and for 24-hours has been found sufficient for this purpose; therefore while one batch of hydrolene sufficient for 24 hours production is being used, another batch is receiving the heat treatment before use. The surfaces of the box and cover which are to receive the sealing compound are heated to about 150–180° F. The pouring temperature of the sealing compound is 450–460° F. The preferred sealing compound is a grade of non-wetting hydrolene having relatively high softening point, relatively high mechanical strength and great resistance to fatigue, since an automotive storage battery is subjected to severe vibration and is frequently subjected to relatively high temperature especially when mounted under the hood and near the engine.

A storage battery so constructed as to take advantage of the permanently bonded sealing compound will now be described with reference to Figs. 5 to 9.

The battery box 120 has its side and end walls shaped to provide shelves or ledges 121 for receiving covers 122 having flanges 123 resting upon the ledges 121. The cell partitions 124 extend between adjacent cover flanges 123 which closely fit the partitions. The box and covers are shaped to provide side grooves 125, end grooves 126 and intermediate grooves 127 for receiving the sealing compound 128. Each end cover 122 is shaped to provide a circular channel 129 merging with a straight channel 130 which merges with end groove 126. The bottoms of channels 129 and 130 are located above the bottoms of the end grooves 126 as indicated at 130a at the upper left hand corner of Fig. 6. Each circular channel surrounds an end terminal post 131 having a foot 132 connected with a group of battery plates 133. Each of the intermediate grooves 127 merges with a recess 135 which surrounds a terminal post 136 having a foot 137 connected with another group of plates, not shown, but understood to be hidden by the group 133 in Fig. 6. The bottoms of the recesses 135 are flush with the bottoms of grooves 127, and each bottom of recess 135 is provided with a hole for receiving a terminal post 136. Each adjacent pair of posts 136 is connected by a strap 138, the top surface of which is below the top surface of the covers 122. Each cover 122 has a filler opening 140 closed by a screw plug 141 which is not provided with any vent hole.

As shown in Figs. 7 and 8, the covers 122 are each provided with the shallow groove 143 for receiving a portion of the lower edge 144 of an acid-resisting member 145 having side walls 146 and end walls 147 (Figs. 8 and 9). Member 145 resembles somewhat an inverted boat. Each side wall 146 is provided with a pair of depending lugs 148 separated by a notch 149 which receives a partition 124, the top edge 124a of which is located below the strap 138 in order to permit precoating the underside of the strap after it has been attached to posts 136. The grooves 143 which merge with the grooves 125 and 127 have their bottoms at a higher elevation than the bottoms of the grooves 125 and 127. Each groove 143 surrounds a tubular boss 150 through which a vent passage 151 is provided. Each side wall 146 is provided with a shoulder or ledge 152 and a plate 153, which may be made of acid-resisting metal, rubber or other non-metallic acid resisting material, is press-fitted between the side walls 146 and bears against the shoulders 152. This plate 153 cooperates with the top wall of the part 145 to define a channel 155 (Fig. 8) which connects the vent passage 151 of one cell cover with the vent passage 151 of the cell cover adjacent thereto.

The right end cell cover 122 is provided at its lower right hand corner with a groove 160 merging with grooves 125 and 126 and surrounding a tubular boss 161 through which a vent hole 162 is formed. An acid-resisting block 165 rests upon the bottom of the groove 160 with the boss 161 extending into the angular passage 166 provided in said block. The block 165 has an extension 167 engaging a right end wall portion of cover 122 which defines groove 126. Passage 166 extends through a tubular extension 168 of the block 165 to receive a tube of rubber or other acid resisting flexible material through which fumes and vapors from the battery may be conducted away. Passage 166 can be anywhere around the periphery of the battery. Block 165 could be omitted and the part 145 could be provided with tubular extension 168 having passage 166 connected with channel 155 of part 145.

Before the cell covers are assembled with the box, the plate and separate groups are placed in cells of the box and then the covers 122 are assembled with the box as shown. Then the straps 138 are placed upon the post 136 as shown and are permanently joined by "burning." The straps 138 are located above the top edges of the partitions 124 and below the top surface of the covers. Before the parts 145 and 160 are assembled, the grooves 125, 126 and 127 between the box side walls and partitions and the sides of the covers, and all of recesses 135, 143 and 160 heretofore described and all of the battery terminal posts 131 and 136 and the straps 138, in fact every surface which is to receive the sealing compound 28 is given a brush coating of a bituminous sealing compound with a suitable solvent such as previously described. After that has been done the undersides of the parts 145 and 160 are coated also with a solution of the sealing compound and the coated parts 145 and 160 are assembled as shown without waiting for the coating to dry.

After all of the coated surfaces of the assembled battery have been allowed to dry in air, the battery passes to chamber B (Fig. 1) where the rays of infra-red lamps are directed upon the surfaces to receive sealing compound in order to remove any remaining moisture. Following this treatment which lasts for about 36 seconds, the battery passes out into the open where a portion of the sealing compound is poured in so that the grooves 125, 126 and 127 are about half full. Then the battery passes into the second chamber D (Fig. 1) where the rays of a greater number of infra-red lamps impinge upon the grooves, channels and recesses and all of the parts which have been coated, and this treatment is continued for about 72 seconds. Then the battery passes out into the open where the remainder of the sealing compound is poured into the grooves, channels and recesses with the result that the straps 138 are submerged and the surfaces of the sealing compound reach the underside of the plates 153 of parts 145 as shown in Fig. 4. Each plate 153 serves to block off the entrance of sealing compound into the groove 155 so that the passage of the battery vapors under pressure from one cell to the other is not obstructed. The application of the precoating of sealing compound provides such a bond between the sealing compound poured in and the contacted surface of the non-metallic and metal parts that all joints are permanently sealed and therefore are leak-proof. An effective seal is provided not only between the cell covers and the sides and partitions of the box, but also an effective seal is provided around each terminal post so that battery liquid cannot escape. The bond is of such nature that when the battery is subjected to severe vibration, as in an automobile or airplane or tank, the seal is not disrupted.

The present method can be used in sealing containers and covers made of rubber and substances other than rubber, such as glass, enamelled steel and molded plastic compounds, particularly thermal setting plastic compounds which are acid-resisting. One such thermal-setting acid-resisting plastic compound is disclosed in the copending application of Robert A. Daily and George K. Shroyer, Serial No. 462,592, filed October 19, 1942.

If the hydrolene has a high melting point, it is possible to omit the infra-red ray treatment and yet obtain a satisfactory bond between the hydrolene and the precoated metallic and non-metallic parts, because the heat of the melted hydrolene is sufficient to cause it to fuse with the precoating layer of the hydrolene and to expel traces of the solvent used in the precoating solution. If hydrolene having relatively lower melting point is used, the precoated surfaces should be heated in the manner disclosed. It is certain that, when the infra-red ray treatment is used, a satisfactory bond will be obtained for all types of hydrolenes.

While the embodiment of the present invention as herein disclosed, constitutes a preferred form, it is to be understood that other forms might be adopted, all coming within the scope of the claims which follow.

What is claimed is as follows:

1. The method of sealing a storage battery having an electrolyte containing chamber and interfitting parts located above the chamber, said parts having surfaces defining seal grooves located above the joints between the parts which comprise coating the surfaces of the grooves with a solution of the sealing material in a volatile solvent in order to carry the material into the pores of the groove surfaces and to expel air therefrom, drying the coating, and pouring into the grooves heated sealing material with which the coating becomes integral.

2. The method of sealing a storage battery having an electrolyte containing chamber and interfitting parts located above the chamber, said parts having surfaces defining seal grooves located above the joints between the parts which comprises coating the surfaces of the grooves with a solution of the sealing material in a volatile solvent in order to carry the material into the pores of the groove surfaces and to expel air therefrom, air-drying the coating, subjecting the coated groove surfaces to the action of heat rays further to dry the coating and to obtain a skin heating of the seal groove surfaces, and pouring into the grooves heated sealing material with which the coating becomes integral.

3. The method of sealing a storage battery having an electrolyte containing chamber and interfitting parts located above the chamber, said parts having surfaces defining seal grooves located above the joints between the parts which comprises coating the surfaces of the grooves with a solution of the sealing material in a volatile solvent in order to carry the material into the pores of the groove surfaces and to expel air therefrom, subjecting the coating to air drying, subjecting the coated seal groove surfaces to the action of heat rays further to dry the coating and to obtain a skin heating of the seal groove surfaces, partially filling the seal grooves with sealing compound, subjecting the sealing compound and seal groove surfaces to the further action of heat rays to cause air to rise to the surface of the compound and to form bubbles to obtain further heating of the skin of the seal grooves, completely filling the seal grooves with sealing compound during which operation air rises to the surfaces of the added sealing compound and forms bubbles, and removing the bubbles by the action of gas flames impinging upon the compound.

ROBERT A. DAILY.